United States Patent
Varadarajan et al.

(10) Patent No.: US 12,321,873 B2
(45) Date of Patent: Jun. 3, 2025

(54) AUTOMATICALLY DETERMINING OPTIMAL TRANSPORT SERVICE LOCATIONS FOR POINTS OF INTEREST FROM NOISY MULTIMODAL DATA

(71) Applicant: GRABTAXI HOLDINGS PTE. LTD., Singapore (SG)

(72) Inventors: Jagannadan Varadarajan, Singapore (SG); Sien Yi Tan, Singapore (SG); Nguyen Duy Duong, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/767,284

(22) Filed: Jul. 9, 2024

(65) Prior Publication Data
US 2024/0362548 A1     Oct. 31, 2024

Related U.S. Application Data

(63) Continuation of application No. 18/506,670, filed on Nov. 10, 2023, now Pat. No. 12,067,507, which is a
(Continued)

(51) Int. Cl.
*G06Q 10/02*    (2012.01)
*G06F 16/29*    (2019.01)
(Continued)

(52) U.S. Cl.
CPC .......... *G06Q 10/047* (2013.01); *G06F 16/29* (2019.01); *G06Q 10/02* (2013.01);
(Continued)

(58) Field of Classification Search
CPC .. G08G 5/80; G08G 5/74; G08G 5/55; G08G 5/21; G08G 5/76; G08G 5/59
See application file for complete search history.

(56) References Cited

U.S. PATENT DOCUMENTS

| | | |
|---|---|---|
| 9,476,970 B1 | 10/2016 | Fairfield et al. |
| 10,187,747 B1 | 1/2019 | Zhang et al. |
| (Continued) | | |

FOREIGN PATENT DOCUMENTS

| | | |
|---|---|---|
| CN | 106663307 A | 5/2017 |
| GB | 2 397 683 A | 7/2004 |
| (Continued) | | |

OTHER PUBLICATIONS

Information Disclosure Statement dated Dec. 1, 2021 which was filed in connection with U.S. Appl. No. 17/419,625.
(Continued)

*Primary Examiner* — Mathew Franklin Gordon
(74) *Attorney, Agent, or Firm* — Buckley, Maschoff & Talwalkar LLC

(57) ABSTRACT

A method, a computer-readable medium, and an apparatus for transport service are provided. The apparatus may receive a plurality of transport service transactions associated with a point of interest entity. For each transport service transaction, the apparatus may determine a transport service location at which the transport service transaction is executed. The apparatus may cluster the transport service locations determined for the plurality of transport service transactions. The apparatus may determine one or more candidate transport service locations for the point of interest entity based on the clustering. The apparatus may provide the one or more candidate transport service locations to a client or a service provider associated with a transport service transaction that is to be executed at the point of interest entity.

20 Claims, 10 Drawing Sheets

Related U.S. Application Data continuation of application No. 17/419,625, filed as application No. PCT/SG2019/050085 on Feb. 13, 2019, now Pat. No. 11,836,652.

(51) Int. Cl.
| | |
|---|---|
| *G06Q 10/047* | (2023.01) |
| *G06Q 10/0631* | (2023.01) |
| *G06Q 10/0835* | (2023.01) |
| *G06Q 50/40* | (2024.01) |
| *H04W 4/02* | (2018.01) |
| *H04W 4/40* | (2018.01) |

(52) U.S. Cl.
CPC .. *G06Q 10/06315* (2013.01); *G06Q 10/08355* (2013.01); *G06Q 50/40* (2024.01); *H04W 4/027* (2013.01); *H04W 4/40* (2018.02)

(56) References Cited

U.S. PATENT DOCUMENTS

| | | | |
|---|---|---|---|
| 2016/0034828 | A1 | 2/2016 | Sarawgi et al. |
| 2017/0059347 | A1 | 3/2017 | Flier et al. |
| 2017/0169535 | A1 | 6/2017 | Tolkin et al. |
| 2017/0370734 | A1 | 12/2017 | Colijn et al. |
| 2018/0017405 | A1 | 1/2018 | Chen et al. |
| 2018/0135993 | A1 | 5/2018 | Thangaraj et al. |
| 2018/0188049 | A1 | 7/2018 | Shi et al. |
| 2019/0018425 | A1 | 1/2019 | Harish et al. |
| 2019/0266625 | A1 | 8/2019 | Kikuchi et al. |

FOREIGN PATENT DOCUMENTS

| | | |
|---|---|---|
| WO | 2014/074407 A1 | 5/2014 |
| WO | 2018/190428 A1 | 10/2018 |
| WO | 2018/227395 A1 | 12/2018 |

OTHER PUBLICATIONS

International Search Report (Application No. PCT /SG2019/050085) dated Apr. 30, 2019.
Written Opinion (Application No. PCT /SG2019/050085) dated Apr. 30, 2019.
Castro, P. S., et al., "From Taxi GPS Traces to Social and Community Dynamics: A Survey"; ACM Computing Surveys, Nov. 2013, 34 pp., vol. 46, No. 2, Article 17.
Hu, H., et al., "Crowdsourced POI Labelling: Location-Aware Result Inference and Task Assignment"; 32nd IEEE International Conference on Data Engineering (ICDE 2016), In Conference Proceedings; May 16-20, 2016, pp. 1-12, Helsinki, Finland.
Touya, G., et al., "Assessing Crowdsourced POI Quality: Combining Methods Based on Reference Data, History, and Spatial Relations"; ISPRA International Journal of Geo-Information, 2017, 6, 80; pp. 1-29.
"Near Real Time CPU Face detection using deep learning"; GitHub—iitzco/faced; Aug. 28, 2018; https://github.com/iitzco/faced.
"Face Recognition Using Tensorflow"; GitHub—davidsandberg/facenet; Apr. 16, 2018, https://github.com/davidsandberg/facenet.
Parkhi, Omkar M., et al., "Deep Face Recognition"; Visual Geometry Group, Department of Engineering Science, University of Oxford, 2015, pp. 1-12, http://www.robots.ox.ac.uk/~vgg/publications/2015/Parkhi15/parkhi15.pdf.
Schroff, Florian et al., Jun. 17, 2015, "FaceNet: A Unified Embedding for Face Recognition and Clustering"; pp. 1-10, https://arxiv.org/abs/1503.03832.
Gisselbrecht, Thibault et al., May 2, 2018, "Machine Learning on Voice: a gentle introduction with Snips Personal Wake Word Detector"; pp. 1-14, https://medium.com/snips-ai/machine-learning-on-voice-a-gentle-introduction-with-snips-personal-wake-word-detector-133bd6fb568e.
Carter, Jamie, Jun. 27, 2012, "Telematics: what you need to know"; TechRadar, pp. 1-15, https://www.techradar.com/sg/news/car-tech/telematics-what-you-need-to-know-1087104.
Dharani, Shafiq et al., Apr. 11, 2018, "Telematics: Poised for strong global growth"; McKinsey & Company Automotive & Assembly, pp. 1-10, https://www.mckinsey.com/industries/automotive-and-assembly/our-insights/telematics-poised-for-strong-global-growth.
"Driver Telematics Analysis, Use telematic data to identify a driver signature"; Kaggle, https://www.kaggle.com/c/axa-driver-telematics-analysis.
Bhuiyan Johana, Aug. 24, 2015, "Uber Is Laying The Groundwork For Perpetual Rides In San Francisco"; Buzzfeed News; pp. 1-5, https://www.buzzfeednews.com/article/johanabhuiyan/uber-is-laying-the-groundwork-for-perpetual-rides-in-san-fra.
Chakraborty, S. et al., "Analysis and Study of Incremental DBSCAN Clustering Algorithm"; International Journal of Enterprise Computing and Business Systems, ISSN (Online) 2230-8849, Jul. 2011, pp. 1-15, vol. 1, Issue 2, http://www.ijecbs.com.
Goyal, N. et al., "An Efficient Density Based Incremental Clustering Algorithm in Data Warehousing Environment"; 2009 International Conference on Computer Engineering and Applications, pp. 1-5, IPCSIT vol. 2, (2011) IACSIT Press, Singapore.
Information Disclosure Statement dated Feb. 24, 2022 which was filed in connection with U.S. Appl. No. 17/419,625.
Extended European Search Report in EP Application No. 19914 702.6 mailed Jan. 24, 2022, 8 pp.
Information Disclosure Statement dated Jun. 15, 2022 which was filed in connection with U.S. Appl. No. 17/419,625.
Japanese Office Action in Application No. 2021-542334 mailed May 17, 2022 (9 pages).
Information Disclosure Statement dated Aug. 9, 2022 which was filed in connection with U.S. Appl. No. 17/419,625.
Chinese Office Action for Application No. 201980090298.0, mailed Jun. 6, 2022, 11 pp. Chinese Language.
Chinese Office Action for Application No. 201980090298.0, mailed Jun. 6, 2022, 16 pp. English Language.
Information Disclosure Statement dated May 24, 2023 which was filed in connection with U.S. Appl. No. 17/419,625.
Indian Office Action (Application No. 202117028681) mailed Nov. 22, 2022, (5 pages).
Notice of Allowance dated Aug. 4, 2023 which was recieved in connection with U.S. Appl. No. 17/419,625.
Notice of Allowance dated Jun. 18, 2024 which was received in connection with U.S. Appl. No. 18/506,670.

AUTOMATICALLY DETERMINING OPTIMAL TRANSPORT SERVICE LOCATIONS FOR POINTS OF INTEREST FROM NOISY MULTIMODAL DATA

CROSS-REFERENCE

This application is continuation application claiming benefit of and priority to U.S. patent application Ser. No. 18/506,670, filed on Nov. 10, 2023 which is a continuation of U.S. patent application Ser. No. 17/419,625 which was filed on Jun. 29, 2021, which is a U.S. National Stage Application under 35 U.S.C. 371 claiming benefit of and priority to International Application No. PCT/SG2019/050085, filed on Feb. 13, 2019, each of which are incorporated by reference herein in their entirety.

TECHNICAL FIELD

Various aspects of this disclosure generally relate to transport services, and more particularly, to the determination of optimal transport service locations.

BACKGROUND

An on-demand transport service provider (e.g., a driver) receives requests from clients for transportation of one or more persons or items from an initial location to a destination. Typically, the client designates a location for the driver to pick up the one or more persons or items and begin the trip; the driver then determines a location to drop off the persons or items at the destination to complete the trip. The manual determination of pickup and drop-off locations can often yield pickup and drop-off locations that are not optimized for actual road conditions, or may delay pick up time or total trip time due to poorly chosen pickup and/or drop-off locations. Manually finding suitable pickup or drop-off locations for every possible point of interest (POI) is tedious and un-scalable to curate, and unpleasant for the client and the driver.

SUMMARY

The following presents a simplified summary in order to provide a basic understanding of various aspects of the disclosed invention. This summary is not an extensive overview of all contemplated aspects, and is intended to neither identify key or critical elements of all aspects nor delineate the scope of any or all aspects. The sole purpose is to present some concepts of one or more aspects in a simplified form as a prelude to the more detailed description that is presented later.

A solution to automatically infer or discover transport service locations (e.g., pickup locations, drop-off locations, etc.) specific to a point of interest or area of interest (AOI) that are suitable or optimal for both the service provider and the requester is provided. These locations may be inferred from a multitude of signals including noisy Global Positioning System (GPS), images, videos, audios, e-wallet transactions, telematics data (e.g., door opening, closing, seat belt usage from car sensors), and user interaction data from the provider and requester application programs. The audio, visual, textual, and location data may come from the driver application program and/or the passenger application program. Although transport service is illustrated as an example in which the solution may be applied, the solution may be extended and generalized to other services such as food delivery and logistics.

In one aspect of the disclosure, a method, a computer-readable medium, and an apparatus for transport service are provided. The apparatus may receive a plurality of transport service transactions associated with a point of interest entity. For each transport service transaction of the plurality of transport service transactions, the apparatus may determine a transport service location at which the transport service transaction is executed. The apparatus may cluster the transport service locations determined for the plurality of transport service transactions. The apparatus may determine one or more candidate transport service locations for the point of interest entity based on the clustering. The apparatus may provide the one or more candidate transport service locations to a client or a service provider associated with a transport service transaction that is to be executed at the point of interest entity.

To the accomplishment of the foregoing and related ends, the aspects disclosed include the features hereinafter fully described and particularly pointed out in the claims. The following description and the annexed drawings set forth in detail illustrate certain features of the aspects of the disclosure. These features are indicative, however, of but a few of the various ways in which the principles of various aspects may be employed, and this description is intended to include all such aspects and their equivalents.

DETAILED DESCRIPTION

Figure 1:
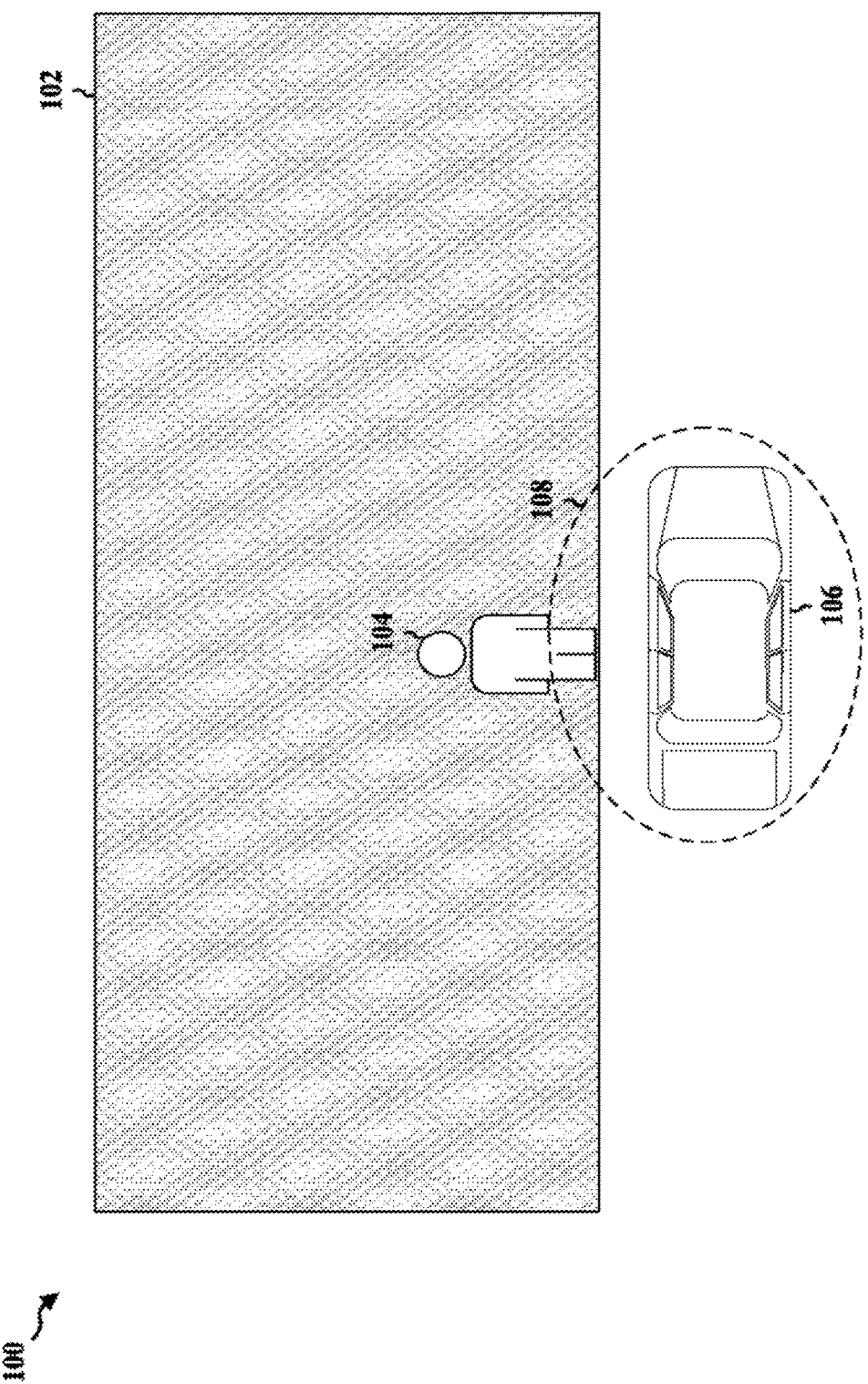
FIG. 1 is a diagram illustrating an example of transport service transaction.

The detailed description set forth below in connection with the appended drawings is intended as a description of various possible configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of providing transport service will now be presented with reference to various apparatus and methods. The apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram 100 illustrating an example of a transport service transaction. In the example, a client may request a service provider 106 to pick up or drop off a rider 104 at a POI 102. In some embodiments, the client may be the rider 104. The POI 102 may occupy a large area. Therefore, a precise transport service location 108 may need to be determined in order to facilitate the transport service transaction.

Understanding precise service locations for pickup, drop-off, and delivery is crucial for ride-hailing and delivery services. While most mapping solutions have POI information, they rarely have detailed information about various access points, entrances and exits etc., which is vital to complete the first mile and last mile segments of the service successfully. Towards this goal, a machine learning based solution is provided to automatically infer the service locations (e.g., given by latitude and longitudinal coordinates on the map) by mining GPS trails of historical bookings.

Inferring the precise service locations helps to understand the exact locations of pickups and drop-offs for a POI, and hence the travel times corresponding to a trip originating or ending at the POI. Further, inferring the precise service locations helps to uncover new locations that are preferred or selected by passengers. Thus, inferring the precise service locations helps to better estimations of travel times, as well as improve both passenger and driver experience.

In this disclosure, an automated method to infer preferred service locations for POIs is provided. While traditional implementation uses GPS probes extensively, some embodiments of the solution may be easily extended for processing a multitude of signals including images, videos, voice, text, telematics, and human feedback. Whereas most traditional methods rely solely on GPS data for POI inference, a solution is provided to use a variety of multi-modal data coming from audio, video, text (e.g., passenger-driver chat), and telematics logs that can all be combined to provide a more precise inference of the service locations. In some embodiments, a method is provided to integrate human feedback when uncertainty is high in the inference of the service locations.

Figure 2:
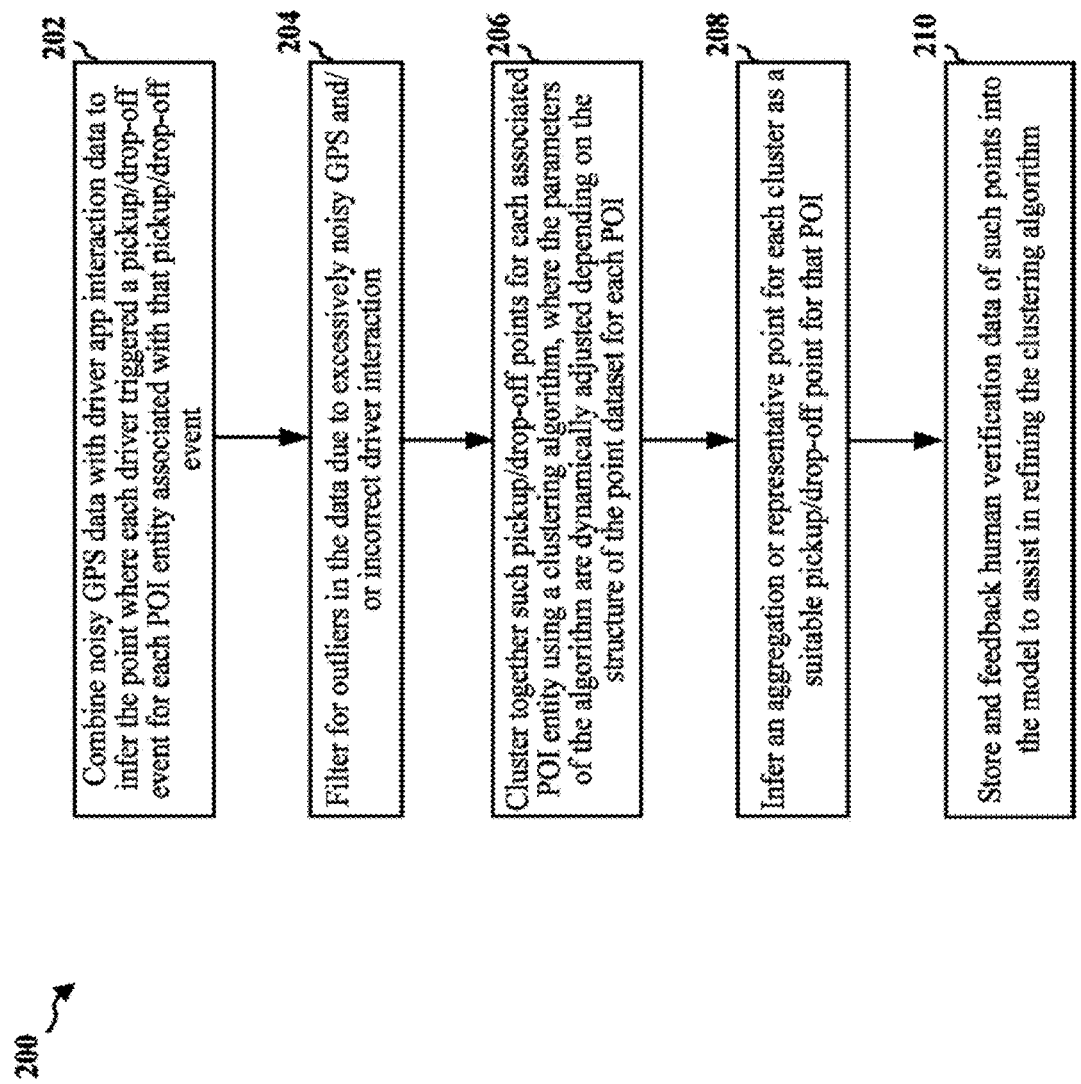
FIG. 2 is a flowchart of a method of automatically determining optimal service locations for point of interests.

FIG. 2 is a flowchart 200 of a method of automatically determining optimal service locations for point of interests. In some embodiments, the method may be performed by an apparatus (e.g., the apparatus 902/902' shown in FIG. 9 or FIG. 10).

At 202, the apparatus may combine noisy GPS data with driver application program interaction data (e.g., when the driver notifies the system that the vehicle has arrived; the drivers are not enforced to perform this action as accurately as possible) to infer the point where each driver triggered a pickup/drop-off event for each POI entity associated with that pickup/drop-off event.

Relying on only GPS probe from driver application program interaction to infer optimal service locations for a POI may not be always reliable, due to variations in when and where the drivers decide to indicate that they have picked up a passenger (an action which is unenforceable), inherent noise and uncertainty of GPS signals. Hence, in some embodiments, the driver interaction data and/or GPS signal may be augmented with additional signals including, but not limited to, images, videos, speech, telematics and inertial motion sensors such as accelerometers, gyroscopes, etc.

Figure 3:
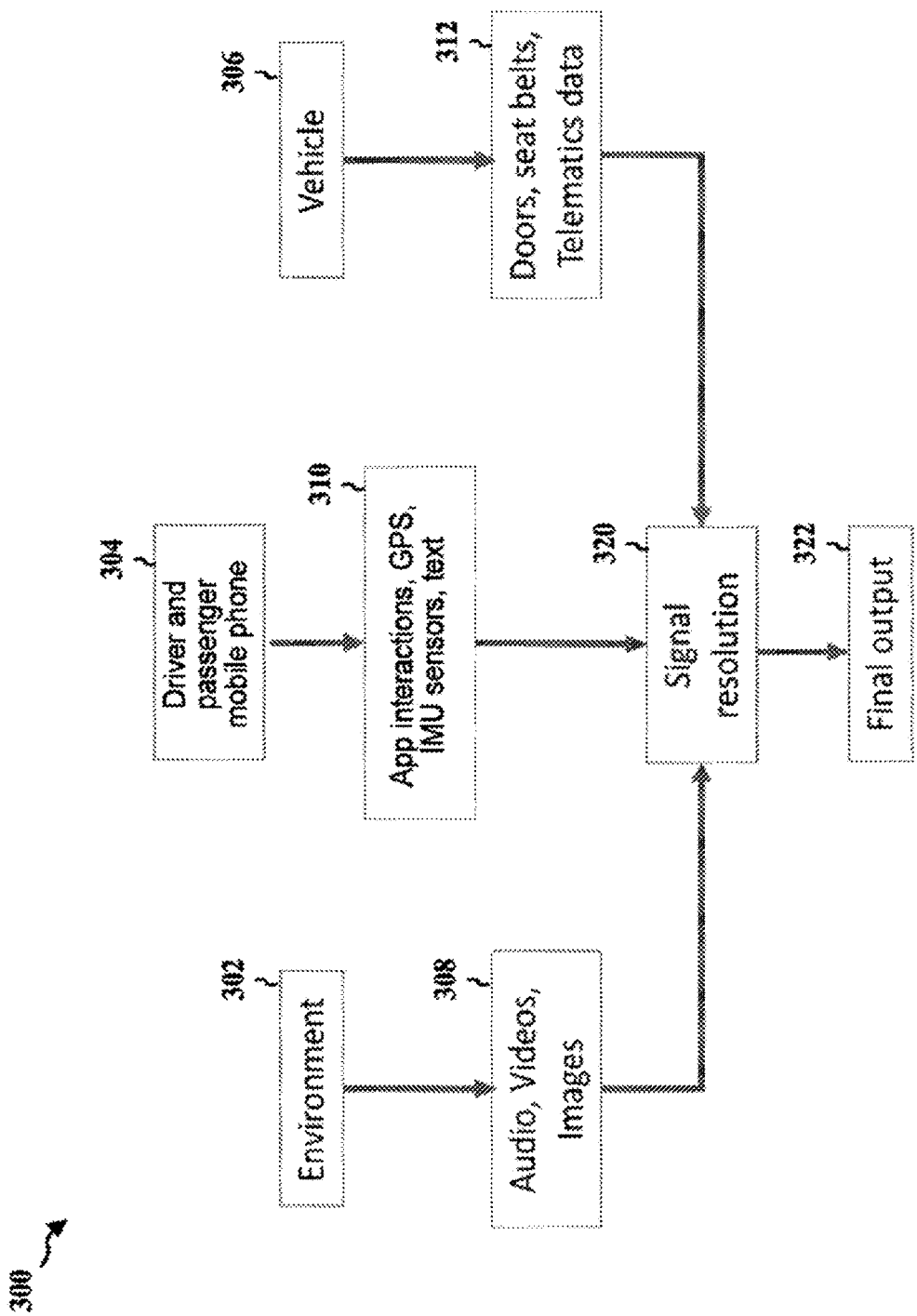
FIG. 3 is a diagram illustrating an example of a general framework of how other data sources may be used for inferring transport service locations.

FIG. 3 is a diagram 300 illustrating an example of a general framework of how other data sources may be used for inferring transport service locations. In the example, those other data sources may include environment 302, driver and passenger mobile phone 304, and vehicle 306. The environment 302 may provide (at 308) audios, videos, and images. The driver and passenger mobile phone 304 may provide (at 310) application program interaction data, GPS data, inertial measurement unit (IMU) sensor data, and text (e.g., passenger-driver chat). The vehicle 306 may provide (at 312) doors and seat belts telematics data. Data from different sources may be combined at 320 to form a signal resolution. At 322, final output of the inferred transport service locations may be obtained.

In order to address security concerns and resolve post-ride disputes, in-facing cameras, and microphones have been used to record data and perform post-mortem analysis. However, this data may be more actively used to serve other purposes. In some embodiments, an in-facing dashboard camera equipped with a face detection and/or recognition system may be used to detect faces inside the car to detect and record when passengers on-board and disembark the vehicle. When the algorithm detects a new face inside the cabin, this can indicate the beginning of a new ride. Similarly, absence of a previously detected face can indicate the end of the ride. The time instants and the GPS signals corresponding to these events may be combined to infer and refine the optimal service locations and the duration of the trip.

Typically, a ride hailing journey starts with driver and passenger greeting each other, the driver verifying the passenger's name and destination, and the passenger agreeing to the details. This also co-occurs with door closures that also have a unique audio signature. In some embodiments, by analyzing these signals, an audio signature may be derived to create canonical forms of such audio signals (similar to wake words used in personal assistants). These signals, in combination with the GPS data, may be used to identify the exact service locations.

Over the years, telematics sensors in cars have improved tremendously both in accuracy and coverage of activities that happen with the car. Telematics sensors may include an on-board GPS (typically more accurate than phone GPS receivers), sensors attached to rear doors, acceleration, brakes, child safety lock, wipers, etc. In a ride-hailing scenario, a driver may serve a sequence of rides continuously, in which case, open and closure of rear and trunk doors may indicate passenger on boarding or disembarking the vehicle. In some embodiments, the timestamps of these activities (as indicated by telematics sensor signals), in conjunction with the recorded GPS signals, may be used to infer the service locations more accurately.

In some embodiments, images and video of the pickup locations may be matched with an existing database of images of the city to narrow down the exact location within the POI. This is useful mainly when GPS signals are noisy and choppy, especially in indoor pickup areas.

Passengers often interact with the map to select a pin location for either pickup or drop-off. These "manual pins" are used typically when passengers do not find a pickup point nearby. In some embodiments, when (unsupervised machine learning) clustering algorithms are applied over manual pins aggregated over time, patterns of usage may be revealed, which in turn can be used to create new POIs. This may further identify potential blind spots in the POI database that can be fixed by more thorough mapping.

Passengers often use text conversations within the ride-hailing application program to provide additional information about the POIs. For example, a passenger might say, "waiting at the pillar marked 3". In some embodiments, mining the chat logs in association with the POI and booking may reveal additional attributes about a POI and potentially help to create new POIs.

Referring back to FIG. 2, at 204, the apparatus may filter for outliers in the data due to excessively noisy GPS and/or incorrect driver interaction.

At 206, the apparatus may cluster together such pickup/drop-off points for each associated POI entity using a clustering algorithm, where the parameters of the algorithm are dynamically adjusted depending on the structure of the point dataset for each POI.

In some embodiments, the clustering algorithm may include several parameters, e.g., the maximum radius of the neighborhood from a point, and the desired minimum cluster size. Typically, the distribution of pickup signals (GPS positions corresponding to the driver's button press) at each POI can vary widely. Whereas popular locations have high density and large variance of occurrences, less known locations (e.g., residential POIs) tend to have sparse concentrated occurrences. Hence, fixed value for clustering parameters may not work in all cases. A conservative value for the clustering parameters may tend to create more than necessary number of clusters for the same POIs while relaxing these parameters may merge the necessary clusters, and furthermore, fail to remove outliers effectively thus impacting the final results negatively.

Figure 4:
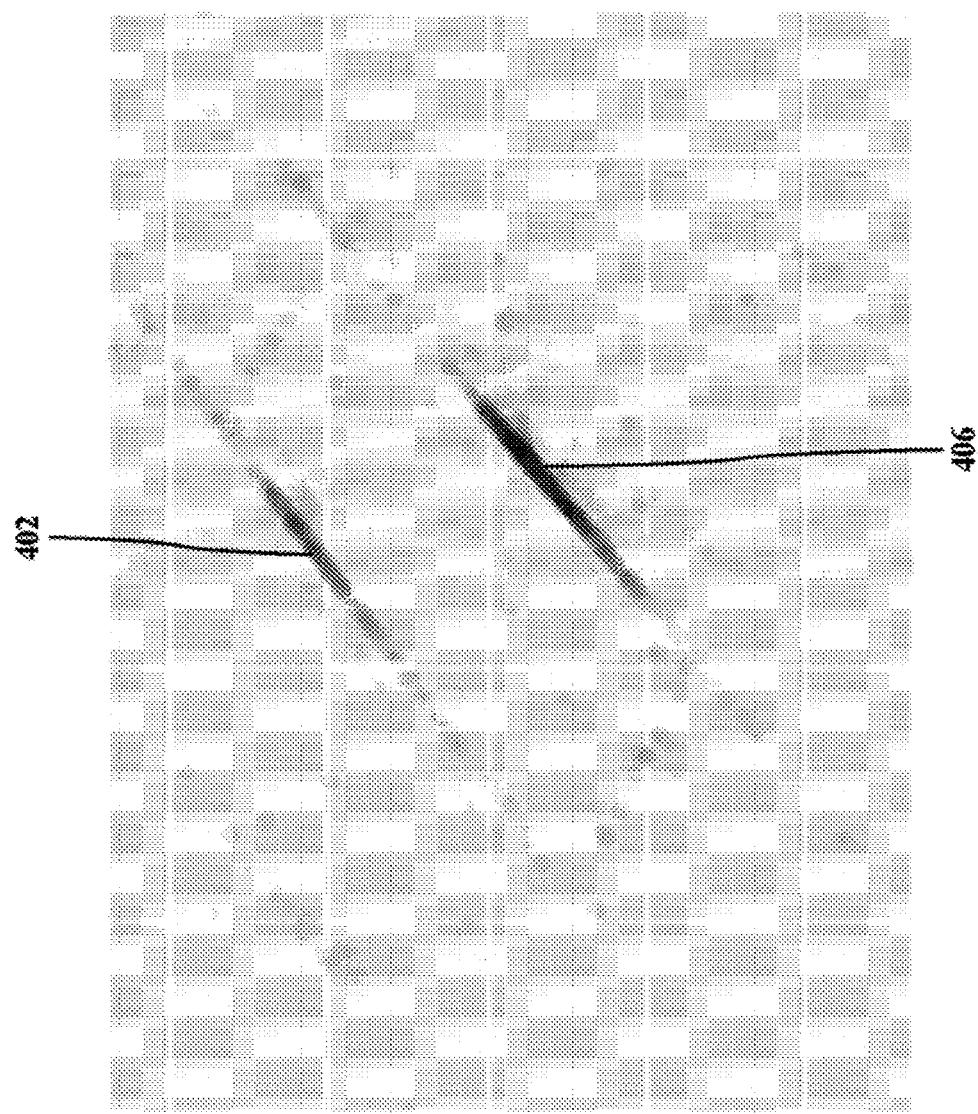
FIG. 4 is a diagram illustrating an example of the clustering result for a POI at 1K samples using certain fixed clustering parameter.

FIG. 4 is a diagram 400 illustrating an example of the clustering result for a POI at 1K samples using certain fixed clustering parameter. As shown, the clustering yields two clusters 402 and 406.

Figure 5:
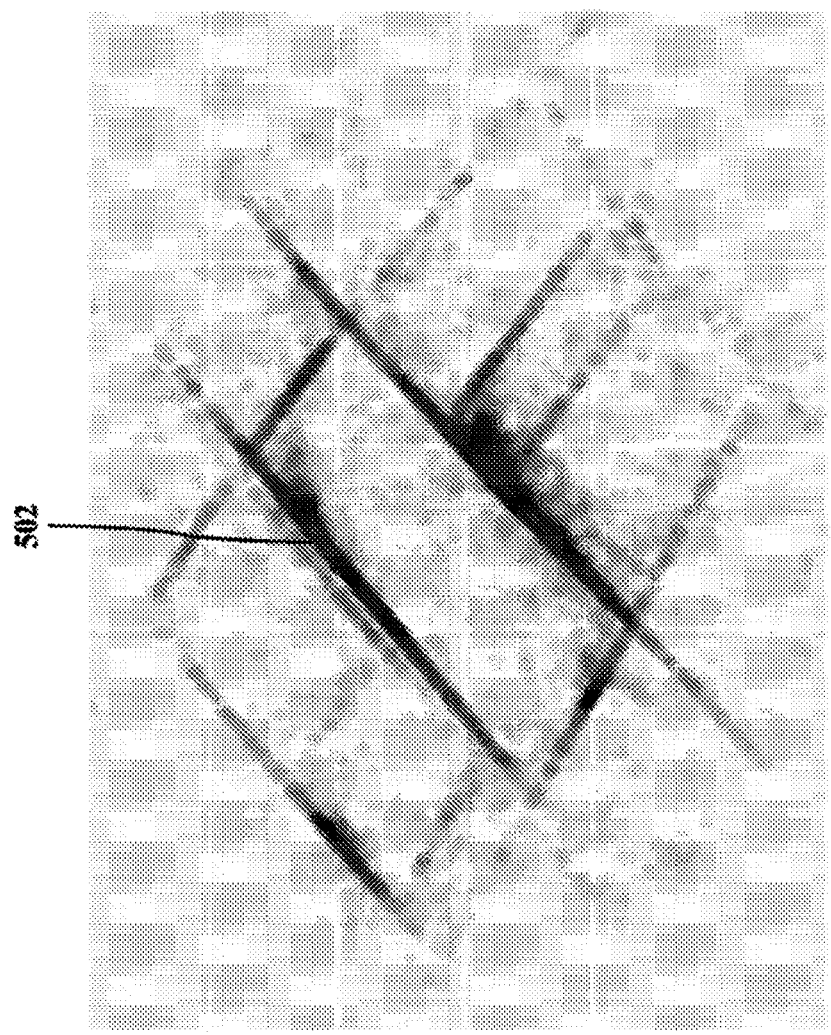
FIG. 5 is a diagram illustrating an example of the clustering result for the POI described above in FIG. 4 at 20K samples (e.g., 1-month dataset) using the same fixed clustering parameter.

FIG. 5 is a diagram 500 illustrating an example of the clustering result for the POI described above in FIG. 4 at 20K samples (e.g., 1-month dataset) using the same fixed clustering parameter. As shown, the clustering yields only one cluster 502, because the clustering algorithm joined all the points together.

In some embodiments, in order to address the issue described above regarding the clustering algorithm, a two-stage process to set and adjust the parameters is provided. During the first step, a clustering parameter (e.g., the maximum radius of the neighborhood from a point) may be fixed to an initial value in all experiments, and another parameter (e.g., the desired minimum cluster size) may be set based on the density of the points observed for the POI. If the clustering algorithm fails (i.e., if it does not return any valid clusters), the clustering parameters may be dynamically adjusted (e.g., relaxed gradually) in order to adjust to the observations. In some embodiments, only a few consecutive attempts may be allowed for this adjustment and "no cluster found" will be reported if the clustering fails even after the maximum number of attempts is exhausted.

In some embodiments, in order to address the issue described above regarding the clustering algorithm, the values of the clustering parameters may be selected automatically. A clustering parameter may need to be re-tuned for different dataset sizes, which is dependent on the popularity of the POI being clustered and the period of the snapshot of data used. In some embodiments, by using heuristics to approximate point densities, e.g. k-nearest neighbors algorithm (k-NN) distances, suitable clustering parameters for each POI may be decided automatically. This may be implemented in the clustering pipeline. As datasets increase in size for certain POIs, button presses may start to 'map' out the street network. This means that clusters that were once distinct may be 'bridged' by these spurious data points.

To this end, in some embodiments, for each point in a POI, the average distance to its k nearest neighbours may be measured. Then the clustering parameter may be set to be at some percentile p of this k-NN distance distribution. For example, in some embodiments, k=3, 4, or 5 etc. and p=90%, 95%, or 99% etc. Setting p higher allows more 'inclusive' (and hence fewer) clusters. In some embodiments, to avoid excessively large clusters on sparser datasets, a maximum cap on a clustering parameter may be set.

Figure 6:
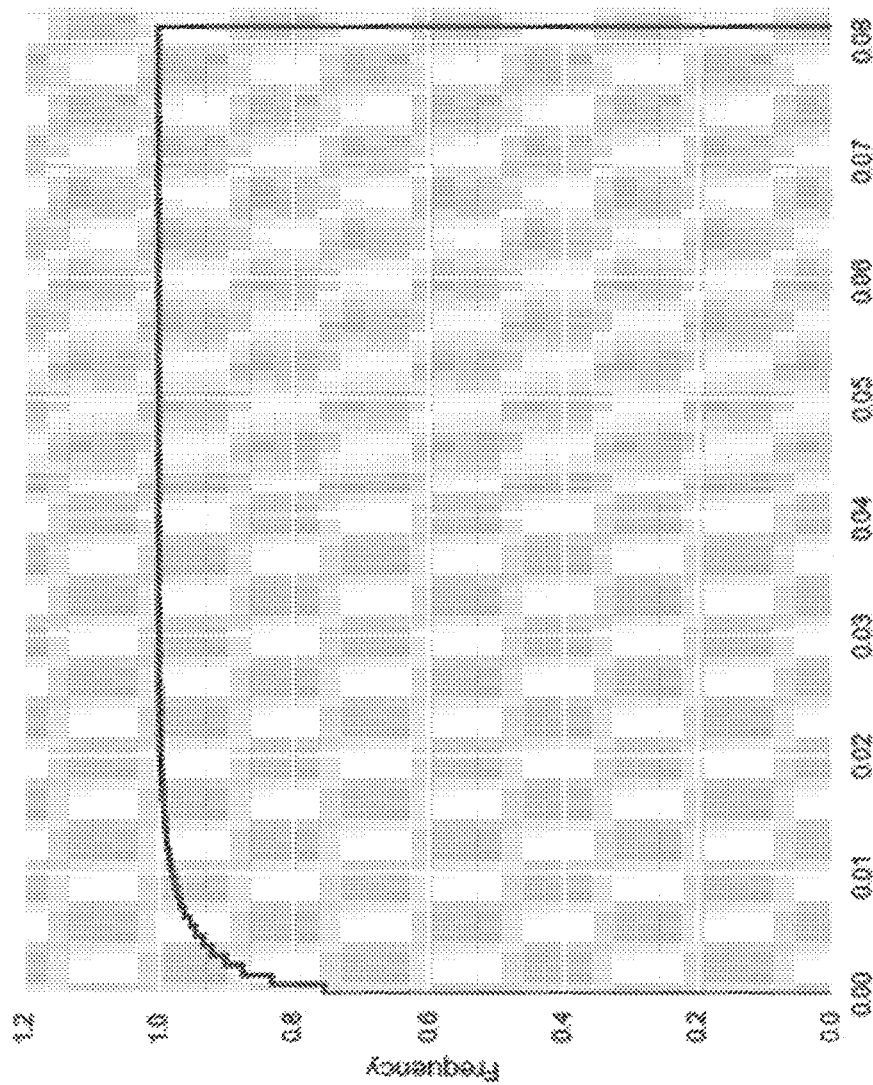
FIG. 6 is a chart illustrating an example of the cumulative distribution function of 5-NN distances (in km) for a POI.
Figure 6:

FIG. 6 is a chart 600 illustrating an example of the cumulative distribution function (CDF) of 5-NN distances (in km) for a POI. As shown, around 80% of the points are within 1 m of its neighbours. Further, 99% of the points are within 14 m of its neighbours.

Figure 7:
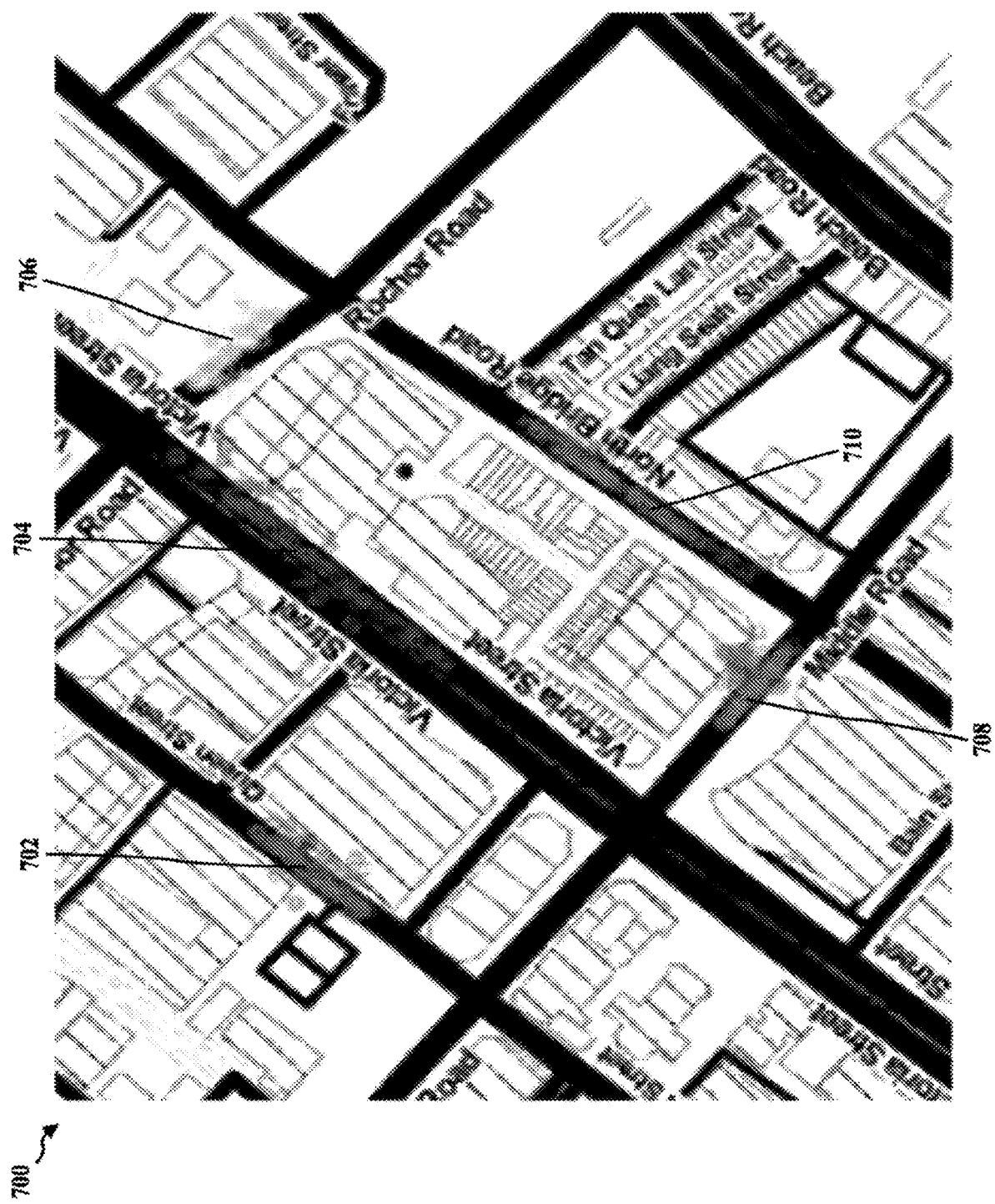
FIG. 7 is a diagram illustrating an example of clustering result for the POI described above in FIGS. 4 and 5 using the methods described above to address the issue of traditional clustering algorithm.

FIG. 7 is a diagram 700 illustrating an example of clustering result for the POI described above in FIGS. 4 and 5 using the methods described above to address the issue of traditional clustering algorithm. As shown, five clusters 702, 704, 706, 708, 710 are identified.

Referring back to FIG. 2, at 208, the apparatus may infer an aggregation or representative point for each cluster as a suitable pickup/drop-off point for that POI. In some embodiments, the aggregation or representative point for a cluster may be the densest point estimated for the cluster. In some embodiments, the inferred points may be stored either for further analysis, human verification, or to directly update the current database of POIs for suitable points.

Some embodiments may be executed regularly, taking input data in batches (e.g., data accumulated over a week or month), processing them in batches and generating or updating the output optimal service locations. However, executing in this manner inevitably leads to delays in changes. The process requires waiting for a week/month for data to accumulate before re-processing. In addition, the process requires a computationally intensive and/or long duration to process because the data is processed as a batch.

Some embodiments may perform 'online/incremental learning' (instead of 'batch learning'), thus solving these problems. Effectively, the learning algorithms may be refactored to update optimal service locations by only receiving a small batch of 'new data points', combined with 'existing memory' of all the 'old data' that the system has learnt from so far. In the extreme case, updates may be calculated with each single new data point that is received.

This allows the system to react faster and on the fly to changing conditions (e.g. an unforeseen closure in an existing road or relocation of an entrance) in a computationally efficient manner. In certain other cases, this also allows to flag anomalies—for instance, a service location bearing the name of a popular destination but moved significantly due to some manual (inserts/deletes) errors. For example, the clustering algorithm may be modified to allow for incremental changes received on the fly.

Referring back to FIG. 2, at 210, the apparatus may store and feedback human verification data of such points into the model to assist in refining the clustering algorithm. Some embodiments may have no human input and may be purely 'mechanically' executed. However, human expertise is still clearly valuable, especially in highly contextual, temporal or behavioral aspects. Some embodiments may have a team of human experts dedicated to curating service location data, though the methods described above help automate most of the process and are meant to augment the ability and speed of the human team in carrying out their work.

Normally, such a working dynamic requires the automated system to 'blindly' process and output results, by which the human team would evaluate and/or correct if necessary. In some embodiments, improvements to this workflow involve either 'ranking' the results for evaluation in some manner (so that the human team prioritizes the most 'important corrections'), and or feeding back the results in some way to improve the system, usually via the team that creates or maintains the algorithms/systems.

A non-trivial improvement to this machine-assisted human curation paradigm involves 'active learning'. Essentially, the system of some embodiments is active in choosing specific clustering tasks it has attempted to solve and 'asking' the human experts whether its solution was 'correct', with the goal of improving itself on subsequent tasks.

In some embodiments, an active learning system may performs these steps: 1. Given a baseline model and set of parameters, find the optimal service locations for some of the data. It need not be all existing data available, a subset will do. For brevity, these output optimal points may be referred to as 'proposed solutions'. 2. Evaluate which proposed solutions should be shown to the human expert for feedback. This can be done by: a. First, measure either of these metrics: Uncertainty of the correctness of a proposed solution, e.g., the algorithm judges that its inference is likely to be erroneous and would need a human-expert to correct it. Informativeness of the potential human-expert answer, e.g., the algorithm judges that the human's answer to this proposed solution has the highest potential to improve the model's overall correctness in as few iterations as possible. The importance of this data point, e.g., it is important to get this location right because it is a high-value POI. A suitable balance of the above. b. Then, show the solutions which rank highly on the metric(s) in (2a). 3. The prioritized solutions in (2b) are shown to human experts (e.g., via a computer dashboard or other suitable human-computer interface). Human experts then provide the 'correct answer' as ground truth (e.g., where the optimal service location really is as judged by a human expert). 4. The human experts' judgments are fed back to the system, and the model parameters are automatically tweaked to reduce its own error on human-provided ground-truth answers. 5. Repeat from Step 1 with the newly tweaked model and parameters, and on either a completely different subset of data, or some of the data used earlier.

Curated service location quality therefore improves at a faster rate and with fewer human interactions than if examples were shown at random for human feedback. This is because human experts are only required to expend efforts on providing more informative answers where they are needed most.

Although the disclosure focusses on ride hailing, one of ordinary skill in the art would recognize that the technology described in this disclosure may be generalized to other applications such as collection and delivery of items such as food or merchandise items. In these cases, the same methodology may be used to infer the service locations, i.e., locations of pickup, locations of parking, and locations of item delivery, etc.

In some embodiments, the optimal transport service locations inferred for a POI may be provided to an automated vehicle (also referred to as a self-driving vehicle). The automated vehicle may provide transport/delivery service at the POI based on the optimal transport service locations to achieve the various benefits described in this disclosure.

Figure 8:
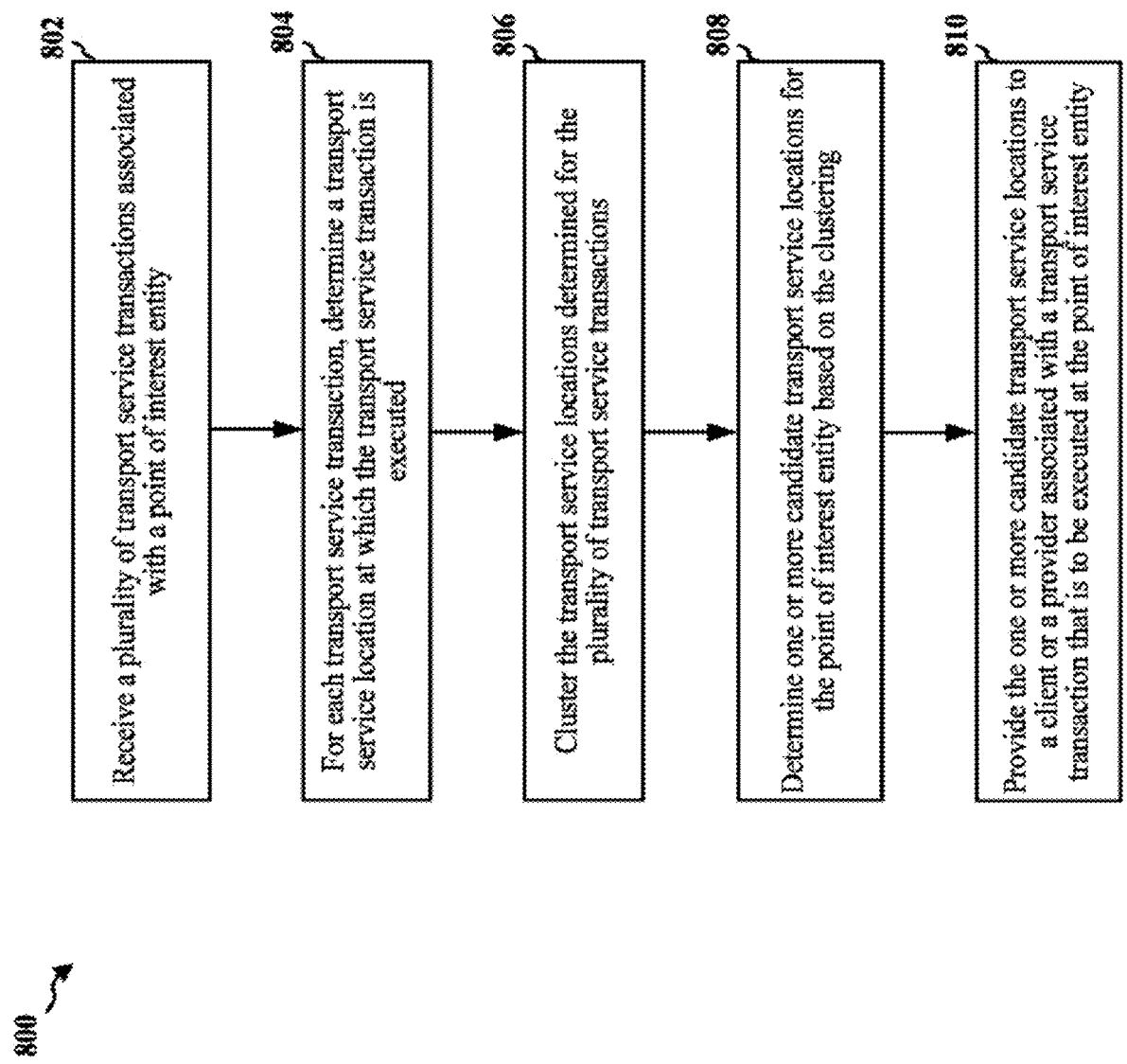
FIG. 8 is a flowchart of a method of transport service.

FIG. 8 is a flowchart 800 of a method of transport service. In some embodiments, the method may be performed by an apparatus (e.g., the apparatus 902/902' shown in FIG. 9 or FIG. 10). In some embodiments, operations performed by the method may correspond to operations described above with reference to FIG. 2.

At 802, the apparatus may receive a plurality of transport service transactions associated with a point of interest entity. In some embodiments, a transport service transaction may include picking up or dropping off one or more persons or one or more items by a service provider at a request of a client.

At 804, for each transport service transaction of the plurality of transport service transactions, the apparatus may determine a transport service location at which the transport service transaction is executed. In some embodiments, a transport service location may be one of a pickup location, a drop-off location, or a delivery location.

In some embodiments, the transport service location may be determined based on GPS data and provider application software interaction data. In some embodiments, the transport service location may be determined based on at least one of an image of the transport service location, a video of the transport service location, telematics data, audio signals, dashboard camera output, client interactions, or chat logs.

At 806, the apparatus may cluster the transport service locations determined for the plurality of transport service transactions. In some embodiments, to cluster the transport service locations, the apparatus may iteratively relax clustering parameters. In such embodiments, the clustering parameters may include the maximum neighborhood radius and the minimum number of points required to form an effective cluster.

In some embodiments, to cluster the transport service locations, for each transport service location of the transport service locations, the apparatus may measure the average distance to k nearest neighbors of the transport service location. The apparatus may automatically adjust the maximum neighborhood radius of the clustering to be at a percentile of the k nearest neighbors distance distribution. In some embodiments, k may be 3, 4, or 5 etc. and the percentile may be 90%, 95%, 99% etc.

At 808, the apparatus may determine one or more candidate transport service locations for the point of interest entity based on the clustering.

At 810, the apparatus may provide the one or more candidate transport service locations to a client or a service provider associated with a transport service transaction that is to be executed at the point of interest entity.

In some embodiments, the apparatus may further select a proposed solution to seek human feedback. The apparatus may refine the one or more candidate transport service locations based on the human feedback.

In some embodiments, the apparatus may receive a second plurality of transport service transactions associated with the point of interest entity. The second plurality of transport service transactions may be the most recent transactions. The apparatus may update the one or more candidate transport service locations based on the second plurality of transport service transactions.

Figure 9:
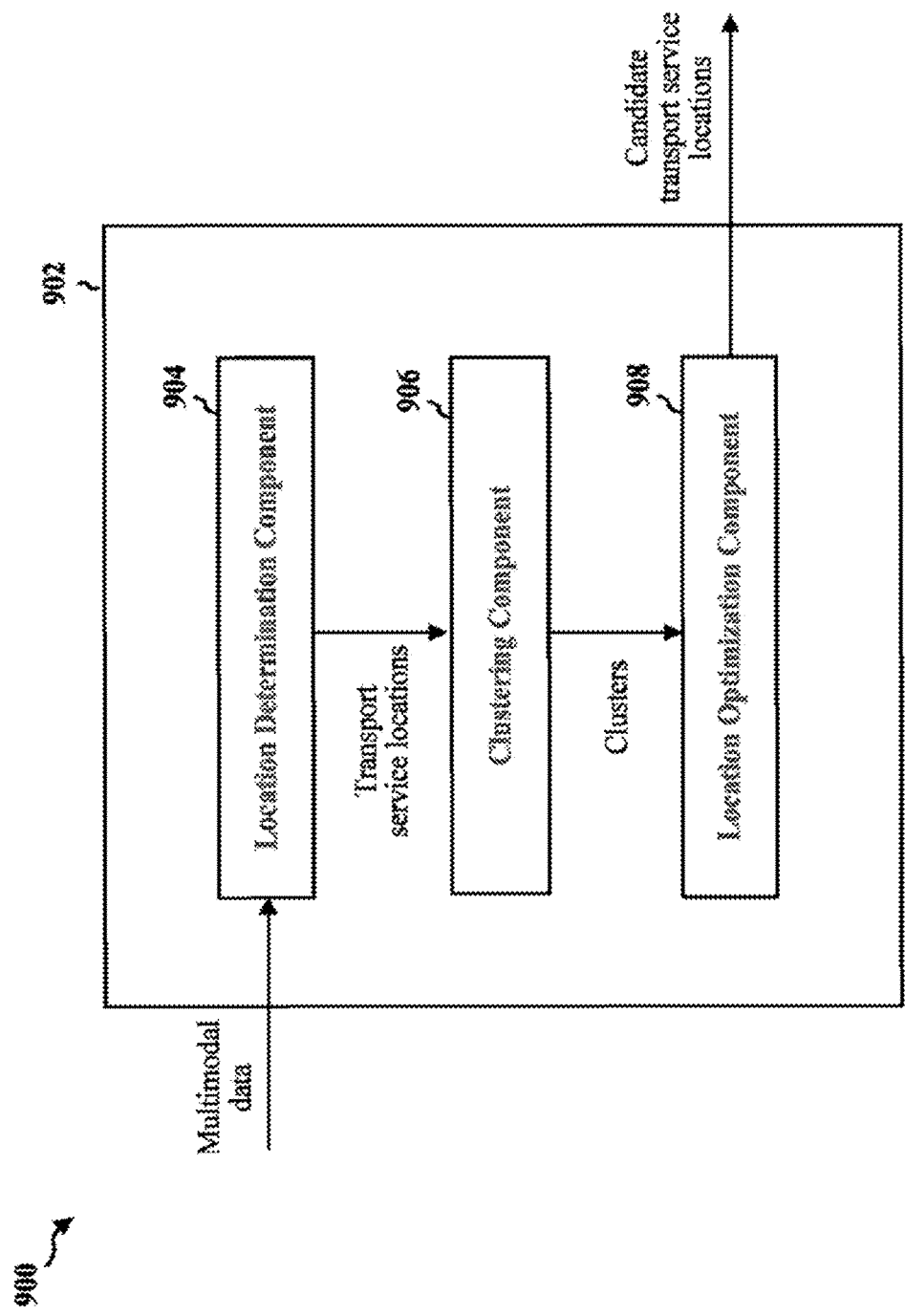
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 may be a computing device or a system including multiple computing devices.

The apparatus 902 may include a location determination component 904 that determines transport service locations for a POI based on multimodal data. In one embodiment, the location determination component 904 may perform the operations described above with reference to 202 in FIG. 2 or 804 in FIG. 8.

The apparatus 902 may include a clustering component 906 that clusters the transport service locations provided by the location determination component 904. In one embodiment, the clustering component 906 may perform the operations described above with reference to 206 in FIG. 2 or 806 in FIG. 8.

The apparatus 902 may include a location optimization component 908 that determines candidate transport service locations for the POI based on the clusters obtained by the clustering component 906. In one embodiment, the location optimization component 908 may perform the operations described above with reference to 208 in FIG. 2 or 808 in FIG. 8.

The apparatus 902 may include additional components that perform each of the blocks of the algorithm in the aforementioned flowcharts of FIGS. 2 and 8. As such, each block in the aforementioned flowcharts of FIGS. 2 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
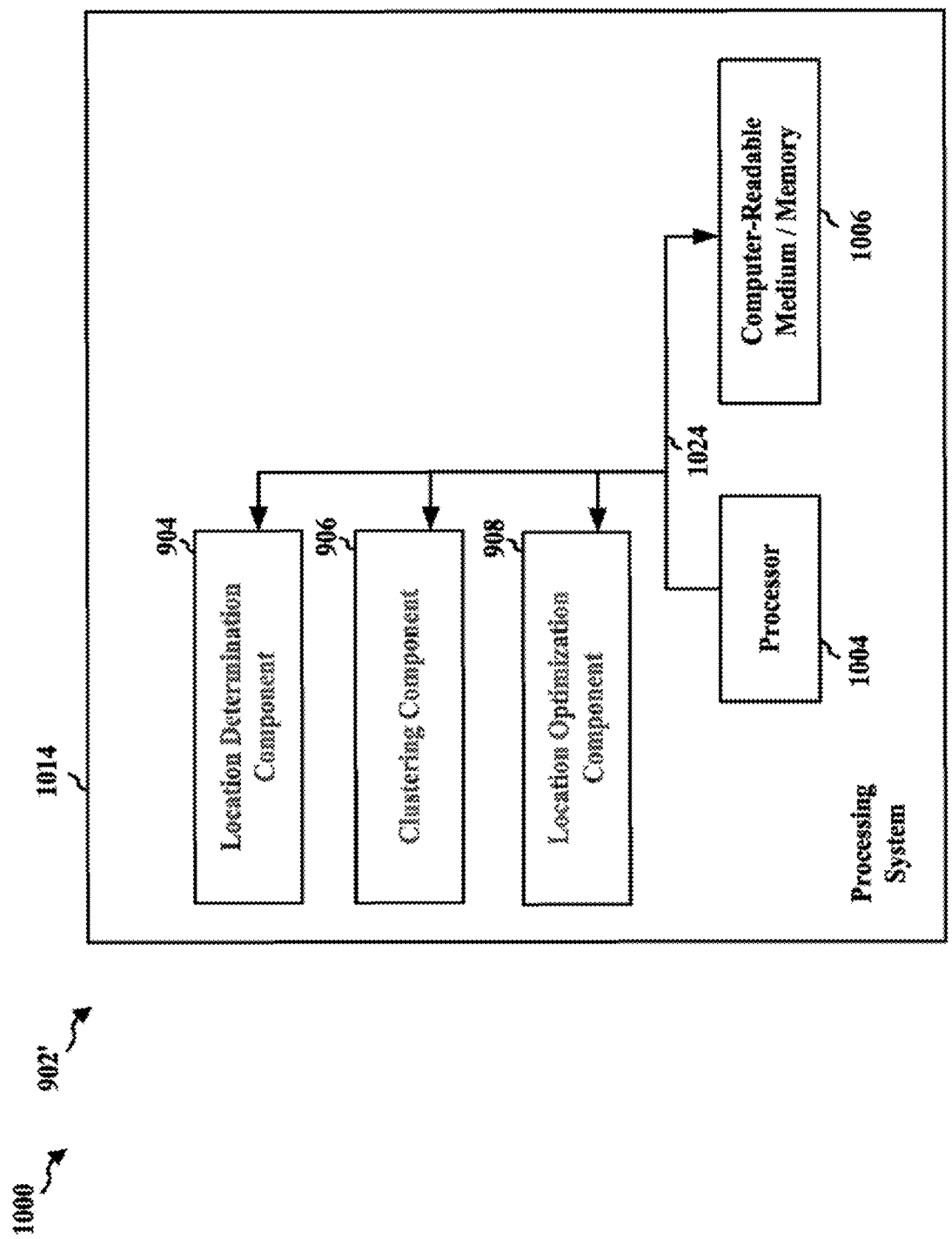
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. In some embodiments, the apparatus 902' may be the apparatus 902 described above with reference to FIG. 9. The apparatus 902' may include one or more computing devices. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and the computer-readable medium/memory 1006. The bus 1024 may also link various other circuits such as timing sources, peripherals, voltage regulators, and power management circuits, which are well known in the art, and therefore, will not be described any further.

The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908. The components may be software components running in the processor 1004, resident/stored in the computer readable medium/memory 1006, one or more hardware components coupled to the processor 1004, or some combination thereof.

In the following, various aspects of this disclosure will be illustrated:

Example 1 is a method, apparatus, or computer program for transport service. The apparatus may: receive a plurality of transport service transactions associated with a point of interest entity; for each transport service transaction of the plurality of transport service transactions, determine a transport service location at which the transport service transaction is executed; cluster the transport service locations determined for the plurality of transport service transactions; determine one or more candidate transport service locations for the point of interest entity based on the clustering; and provide the one or more candidate transport service locations to a client or a service provider associated with a transport service transaction that is to be executed at the point of interest entity.

In Example 2, the subject matter of Example 1 may optionally include that a transport service location may be one of a pickup location, a drop-off location, or a delivery location, where a transport service transaction may include picking up or dropping off one or more persons or one or more items by a service provider at a request of a client.

In Example 3, the subject matter of Example 1 or 2 may optionally include that the transport service location may be determined based on GPS data and provider application software interaction data.

In Example 4, the subject matter of any one of Examples 1 to 3 may optionally include that the transport service location may be determined based on at least one of an image of the transport service location, a video of the transport service location, telematics data, audio signals, dashboard camera output, client interactions, or chat logs.

In Example 5, the subject matter of any one of Examples 1 to 4 may optionally include that the apparatus may: select a proposed solution to seek human feedback; and refine the one or more candidate transport service locations based on the human feedback.

In Example 6, the subject matter of any one of Examples 1 to 5 may optionally include that, to cluster the transport service locations, the apparatus may dynamically adjust clustering parameters.

In Example 7, the subject matter of Example 6 may optionally include that the clustering parameters may include the maximum neighborhood radius and the minimum number of points required to form a cluster.

In Example 8, the subject matter of any one of Examples 1 to 7 may optionally include that, to cluster the transport service locations, the apparatus may: for each transport service location of the transport service locations, approximate the point density distribution of the transport service location; and automatically adjust the maximum neighborhood radius of the clustering based on the approximate point density distribution.

In Example 9, the subject matter of Example 8 may optionally include that k may be an integer between 2 and 10, and the percentile may be between 90% and 99.9%.

In Example 10, the subject matter of any one of Examples 1 to 9 may optionally include that the apparatus may: receive a second plurality of transport service transactions associated with the point of interest entity; and update the one or more candidate transport service locations based on the second plurality of transport service transactions.

A person skilled in the art will appreciate that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

We claim:

1. A method of determining service locations in a transport system, the method comprising:
   receiving data associated with a plurality of transport service transactions associated with a point of interest entity;
   determining, based at least in part on the data for each transport service transaction, a transport service location at the point of interest entity at which the transport service transaction was executed;
   identifying at least a first candidate transport service location associated with the point of interest entity based at least in part on identifying clusters of the transport service locations at which the transport service transactions were executed; and
   storing the at least first candidate transport service location as a suitable service location associated with the point of interest entity.

2. The method of claim 1, wherein the data includes, for each respective transport service transaction (i) geolocation data received from a vehicle, and (ii) provider application software interaction data received from a provider device.

3. The method of claim 1, wherein the data associated with a plurality of transport service transactions further includes at least one of, for each respective transport service transaction: (iii) an image of the transport service location, (iv) a video of the transport service location, (v) telematics data from the vehicle, (vi) audio signal data, (vii) a dashboard camera output, and (viii) interaction data between the provider and a client.

4. The method of claim 1, wherein a transport service location is one of a pickup location, a drop-off location, or a delivery location, wherein a transport service transaction comprises picking up or dropping off one or more persons or one or more items by a service provider at a request of a client.

5. The method of claim 1, wherein identifying clusters further comprises:
applying a clustering algorithm to the data, the clustering algorithm including a parameter indicating a maximum radius from a point and a parameter indicating a desired minimum cluster size.

6. The method of claim 5, wherein the parameter indicating a desired minimum cluster size is automatically selected based at least in part on the count of the plurality of transport service transactions associated with the point of interest entity.

7. The method of claim 6, wherein a maximum cap of the value of the desired minimum cluster size is enforced.

8. The method of claim 5, wherein the parameter indicating a maximum radius from the point is a fixed parameter.

9. The method of claim 5, wherein the parameter indicating a desired minimum cluster size is set based on the density of transport service locations at the point of interest entity at which the transport service transaction was executed.

10. The method of claim 5, further comprising:
dynamically adjusting the parameters if the clustering algorithm does not identify any valid clusters; and
repeating the applying the clustering algorithm to the data using the dynamically adjusted parameters.

11. The method of claim 5, further comprising:
adjusting the clustering algorithm based on human feedback.

12. The method of claim 1, wherein the identifying clusters further comprises:
for each transport service location of the transport service locations, approximating a point density distribution of the transport service location; and
automatically adjusting a maximum neighborhood radius of the clustering based on the approximate point density distribution.

13. The method of claim 1, further comprising:
transmitting, to a provider device, the at least first candidate transport service location as a suitable service location associated with the point of interest entity.

14. A system for determining service locations in a transport system, the system comprising:
a processor; and
a memory in communication with the processor, the memory storing program instructions, the processor operative with the program instructions to perform functions to:
receive data associated with a plurality of transport service transactions associated with a point of interest entity;
determine, based at least in part on the data for each transport service transaction, a transport service location at the point of interest entity at which the transport service transaction was executed;
identify at least a first candidate transport service location associated with the point of interest entity based at least in part on identifying clusters of the transport service locations at which the transport service transactions were executed; and
store the at least first candidate transport service location as a suitable service location associated with the point of interest entity.

15. The system of claim 14, wherein the data includes, for each respective transport service transaction (i) geolocation data received from a vehicle, and (ii) provider application software interaction data received from a provider device.

16. The system of claim 14, wherein the data associated with a plurality of transport service transactions further includes at least one of, for each respective transport service transaction: (iii) an image of the transport service location, (iv) a video of the transport service location, (v) telematics data from the vehicle, (vi) audio signal data, (vii) a dashboard camera output, and (viii) interaction data between the provider and a client.

17. The system of claim 14, wherein identifying clusters further comprises:
applying a clustering algorithm to the data, the clustering algorithm including a parameter indicating a maximum radius from a point and a parameter indicating a desired minimum cluster size.

18. The system of claim 17, wherein the parameter indicating a desired minimum cluster size is automatically selected based at least in part on the count of the plurality of transport service transactions associated with the point of interest entity.

19. The system of claim 18, wherein a maximum cap of the value of the desired minimum cluster size is enforced.

20. The system of claim 17, wherein the parameter indicating a desired minimum cluster size is set based on the density of transport service locations at the point of interest entity at which the transport service transaction was executed.

* * * * *